US008620099B2

United States Patent
Sim (10) Patent No.: US 8,620,099 B2
(45) Date of Patent: Dec. 31, 2013

(54) METHOD, MEDIUM, AND APPARATUS REPRESENTING ADAPTIVE INFORMATION OF 3D DEPTH IMAGE

(75) Inventor: Jae-young Sim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1200 days.

(21) Appl. No.: 12/219,444

(22) Filed: Jul. 22, 2008

(65) Prior Publication Data

US 2009/0161989 A1 Jun. 25, 2009

(30) Foreign Application Priority Data

Dec. 21, 2007 (KR) .................. 10-2007-0135239

(51) Int. Cl.
*G06K 9/00* (2006.01)
(52) U.S. Cl.
USPC ........... 382/251; 382/154; 382/168; 382/232; 382/239

(58) Field of Classification Search
None
See application file for complete search history.

(56) References Cited

U.S. PATENT DOCUMENTS

| | | | | |
|---|---|---|---|---|
| 5,856,829 A * | 1/1999 | Gray et al. | ..................... | 345/422 |
| 6,313,866 B1 * | 11/2001 | Akamatsu et al. | .............. | 348/51 |
| 7,047,305 B1 * | 5/2006 | Brooks et al. | ................. | 709/231 |
| 7,403,201 B2 * | 7/2008 | Takemoto et al. | ............ | 345/419 |
| 7,557,824 B2 * | 7/2009 | Holliman | ........................ | 348/46 |
| 7,558,432 B2 * | 7/2009 | Zaharia et al. | ................ | 382/251 |
| 7,983,477 B2 * | 7/2011 | Holliman | ....................... | 382/154 |
| 2002/0180731 A1 * | 12/2002 | Lapidous et al. | ............. | 345/422 |
| 2003/0218606 A1 * | 11/2003 | Zhirkov et al. | ............... | 345/419 |
| 2005/0244071 A1 * | 11/2005 | Zaharia et al. | ................ | 382/251 |
| 2006/0050383 A1 * | 3/2006 | Takemoto et al. | ............ | 359/462 |
| 2008/0044097 A1 * | 2/2008 | Krishnan et al. | .............. | 382/251 |
| 2010/0074328 A1 * | 3/2010 | Zuo et al. | ................. | 375/240.03 |

FOREIGN PATENT DOCUMENTS

| | | |
|---|---|---|
| EP | 1 591 963 | 11/2005 |
| JP | 06-022148 | 1/1994 |
| JP | 2005-341555 | 12/2004 |
| JP | 2006-261871 | 9/2006 |
| JP | 2007-318071 | 12/2007 |
| JP | 2009-163717 | 7/2009 |
| KR | 1997-0048605 | 7/1997 |
| KR | 1999-0070445 | 9/1999 |
| KR | 10-2004-0023088 | 3/2004 |
| WO | 2006/003611 | 1/2006 |

OTHER PUBLICATIONS

Masayuki Tanimoto et al., "Multi-View Depth Map of Rena and Akko & Kayo", 82. MPEG Meeting in Shenzhen (Motion Picture Expert Group or ISO/IECJTC1/SC29/WG11), No. M14888, Oct. 17, 2007, XP030043494.

(Continued)

*Primary Examiner* — Matthew Bella
*Assistant Examiner* — Jason Heidemann
(74) *Attorney, Agent, or Firm* — Staas & Halsey LLP (57) ABSTRACT

A method, medium, and apparatus processing depth information of a depth image. The apparatus adaptively presenting information on depth information includes a section determination unit determining which one of plural sections respective depth values for pixels of the 3D image fall within, with the plural sections being defined by a measured limit distance for the 3D image being parsed into the plural sections based on distance based depth resolution information, and an adaptive quantization unit to selectively quantize and represent each depth value based on a respective predefined quantization setting of the one section.

16 Claims, 7 Drawing Sheets

(56) References Cited

OTHER PUBLICATIONS

Ravi Krishnamurthy et al. "Compression and Transmission of depth maps for image-based rendering", Proceeding 2001 International Conference on Image Processing. ICIP 2001-Thessaloniki, Greece, Oct. 7-10, 2001; [International Conference on Image Processing], Institute of Electrical and Electronics Engineers, New York, NY, vol. 3, Oct. 7, 2001 pp. 828-831, XP010563478.

Masayuki Tanimoto et al., "Improvement of Depth Map Estimation and View Synthesis", 83. MPEG Meeting in Antalya; (Motion Picture Expert Group or ISO/IEC JTc1/SC29/WG11), No. M15090, Jan. 9, 2008.

European Search Report mailed Oct. 11, 2011 corresponds to European Patent Application No. 08167231.3-1247/2076048.

Chinese Patent Office Action issued Feb. 13, 2012 corresponds to Chinese Patent 200810149782X.

Japanese Office Action issued Mar. 12, 2013 in corresponding Japanese Patent Application No. 2008-282349.

* cited by examiner

METHOD, MEDIUM, AND APPARATUS REPRESENTING ADAPTIVE INFORMATION OF 3D DEPTH IMAGE

CROSS-REFERENCE TO RELATED APPLICATIONS

This application claims the benefit of Korean Patent Application No. 10-2007-0135239, filed on Dec. 21, 2007, in the Korean Intellectual Property Office, the disclosure of which is incorporated herein in its entirety by reference.

BACKGROUND

1. Field

One or more embodiments of the present invention relate to image processing, and more particularly, to a method, medium, and apparatus processing depth information of a depth image.

2. Description of the Related Art

Although various methods of passively extracting 3D information, e.g., from several sheets of color images using computer vision techniques, have been suggested, information obtaining devices such as depth cameras have been generally used to obtain depth images. Such computer vision techniques include performing complex processes and do not provide accurate depth information, whereas depth cameras can relatively easily and accurately obtain depth images and information.

Figure 1:
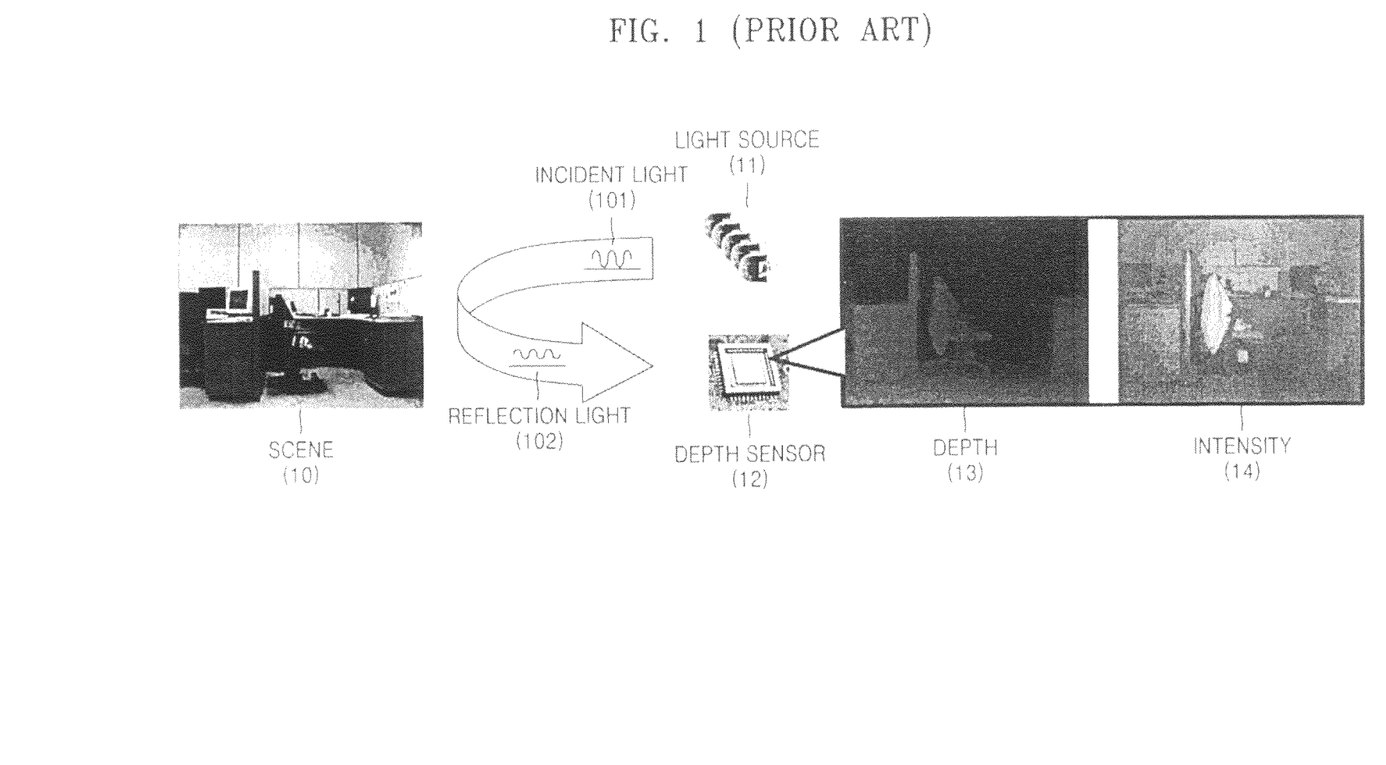
FIG. 1 illustrates a conventional principle behind a use of depth cameras.

FIG. 1 is a conceptual diagram of the conventional principle behind the use of depth cameras. Referring to FIG. 1, a light source 11 irradiates light, such as infrared (IR), onto a scene 10 as an incident light 101, a reflection light 102 of the light source 11 is detected via a depth sensor 12, and time of flight (TOF) is measured in order to calculate a distance between objects of the scene 10. As a result, an intensity image 14 and a depth image 13 of the detected light can be obtained.

In more detail, in such an example, if a photographing button of the depth camera is manipulated, the depth camera would irradiate IR light onto a subject, calculate a depth value of each point of the subject based on time taken between a point when the IR light is irradiated and a point when the reflected IR is detected, and present the depth value as an image in order to generate and obtain the depth image 13 of the subject. Herein, the depth value references the distance between points, e.g., a point on the object and the depth camera.

Each depth value for each pixel of a depth image can be represented by a certain number of bits. In this regard, herein, the present inventors have found that such depth value representations results in generally too much data to represent each depth value of each pixel for the entire depth image, making it impossible to efficiently store, transmit, and process the depth image.

SUMMARY

One or more embodiments of the present invention provide a method, medium, and apparatus adaptively representing information of a depth image in order to represent, based on distances, depth information obtained from a depth camera through an adaptive optimal quantization value based on depth resolution characteristics according to such measured distances.

One or more embodiments of the present invention also provide a method, medium, and apparatus accurately storing and transmitting reduced amounts of depth information by adaptively representing information based on distance ranges of the depth information.

Additional aspects and/or advantages will be set forth in part in the description which follows and, in part, will be apparent from the description, or may be learned by practice of the invention.

To achieve the above and/or other aspects and advantages, embodiments of the present invention include an apparatus adaptively representing information of depth information of a 3D image, the apparatus including a section determination unit to determine which one of plural sections respective depth values for pixels of the 3D image fall within, with the plural sections being defined by a measured limit distance for the 3D image being parsed into the plural sections based on distance based depth resolution information, and an adaptive quantization unit to selectively quantize and represent each depth value based on a respective predefined quantization setting of the one section.

To achieve the above and/or other aspects and advantages, embodiments of the present invention include an apparatus adaptively representing information of depth information of a 3D image, the apparatus including a look-up table storing unit to store a look-up table defined to include quantized representative values, with respective quantized representation values each corresponding to depth based areas of the 3D image obtained by a measured limit distance of the 3D image being parsed into the depth based areas based on distance based depth resolution information, and an adaptive quantization unit to compare respective depth values of pixels of the 3D image with the look-up table and output a corresponding representative value from the look-up table as a corresponding quantized result for the respective depth value.

To achieve the above and/or other aspects and advantages, embodiments of the present invention include a method of representing adaptive information of depth information of a 3D image, the method including determining which one of plural sections respective depth values for pixels of the 3D image fall within, with the plural sections being defined by a measured limit distance for the 3D image being parsed into the plural sections based on distance based depth resolution information, and selectively quantizing and representing each depth value based on a respective predefined quantization setting of the one section.

To achieve the above and/or other aspects and advantages, embodiments of the present invention include a method of representing adaptive information of depth information of a 3D image, the method including searching for representative quantized values corresponding to depth values for pixels of a 3D image from a predefined look-up table, with respective quantized representation values in the look-up table each corresponding to depth based areas of the 3D image obtained by a measured limit distance of the 3D image being parsed into the depth based areas based on distance based depth resolution information, and encoding the depth values by comparing respective depth values of pixels of the 3D image with the look-up table and outputting a corresponding representative value from the look-up table as a corresponding quantized result for the respective depth value.

To achieve the above and/or other aspects and advantages, embodiments of the present invention include a depth data encoder adaptively representing depth information of a 3D image by selectively quantizing depth values of pixels of the 3D image with quantization steps based upon resolution information and respective distances between corresponding pixels represented by the depth values and a view point.

To achieve the above and/or other aspects and advantages, embodiments of the present invention include a depth data encoder adaptively representing depth information of a 3D image by selectively quantizing depth values of pixels of the 3D image with different fixed bit lengths, to generate quantized respective depth values of the pixels of the 3D image, based upon resolution information and respective distances between corresponding pixels represented by respective depth values and a view point.

To achieve the above and/or other aspects and advantages, embodiments of the present invention include a depth data encoding method adaptively representing depth information of a 3D image including selectively quantizing depth values of pixels of the 3D image with quantization steps based upon resolution information and respective distances between corresponding pixels represented by the depth values and a view point.

To achieve the above and/or other aspects and advantages, embodiments of the present invention include a depth data decoding method decoding quantized depth information, including selectively decoding quantized depth information with different quantization steps based on respective distances of corresponding pixels from a view point.

To achieve the above and/or other aspects and advantages, embodiments of the present invention include a depth data encoding method adaptively representing depth information of a 3D image including selectively quantizing depth values of pixels of the 3D image with different fixed bit lengths, to generate quantized respective depth values of the pixels of the 3D image, based upon resolution information and respective distances between corresponding pixels represented by respective depth values and a view point.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Figure 2A:
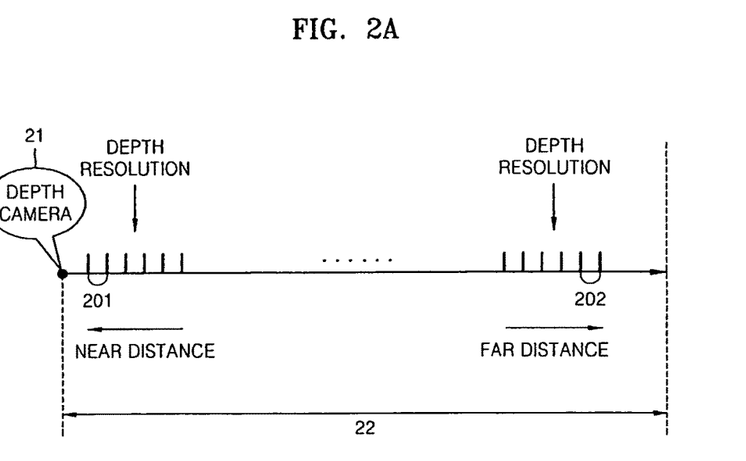
FIGS. 2A and 2B illustrate a depth information representation of a depth camera, according to an embodiment of the present invention.
Figure 2B:
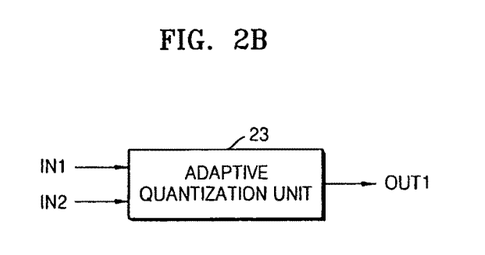

FIGS. 2A and 2B illustrate a depth information representation, according to an embodiment of the present invention. Referring to FIG. 2A, a depth camera 21 may quantize and represent depth information with the same number of bits irrespective of a depth value's correspondence with their respective distances or the measured limit distance 22. That is, here, in FIGS. 2A-2B, each depth value has the same depth resolution. In addition, herein, the measure limit distance 22 is referred to as a maximum depth value measured by the depth camera 21.

In more detail, in this embodiment, the depth camera 21 can represent all depth values with the same depth resolution value irrespective of whether each depth value of pixels of a 3D image indicates a near distance or a far distance from the depth camera 21. Herein, such a 3D image contains a depth value of each pixel and is an example of a depth image obtained by a depth camera. The depth value may be based on a distance from the depth camera, or a view point from which the corresponding object(s) are viewed and 3D information collected. Further, herein, depth resolution can also be referred to as accuracy. In more detail, a high depth resolution of the depth camera 21 would correlate to a small quantization step size when the depth camera 21 quantizes the respective depth value, while a low depth resolution thereof correlates to a large quantization step size when the depth camera 21 quantizes the respective depth value. Accordingly, in this embodiment, the quantization step size 201 that is considered in quantizing a depth value representing a nearer distance from the depth camera 21 is the same as the quantization step size 202 that is considered in quantizing a depth value representing a farther distance from the depth camera 21.

In this regard, as the depth camera 21 may have different available depth resolutions, an appropriate number of bits suitable for the characteristics of the depth camera 21 may be determined. The depth camera 21 may then quantize each depth value by using the determined bit number.

Referring to FIG. 2B, if the depth camera 21 quantizes a depth value that can be measured by the depth camera 21 by using the same depth resolution, the illustrated adaptive quantization unit 23 device may accordingly represent the depth value to satisfy the characteristics of the depth camera 21. In an embodiment, the illustrated adaptive quantization unit 23 device adaptively representing information of a depth image in the present embodiment can be included in the depth camera 21.

In more detail, the adaptive quantization unit 23 may receive measured limit distance information regarding the measured limit distance 22 and depth resolution information regarding the depth resolution that remains unchanged irrespective of a depth value, through an input terminal IN1. In this connection, in an embodiment, the measured limit distance and the depth resolution may be determined as specifications of the depth camera 21 including the adaptive quantization unit 23. Accordingly, the adaptive quantization unit 23 may determine the appropriate number of bits for each depth value representation based on the received measured limit distance 22 and the received depth resolution. As only an example, the determined number of bits may be a minimum number of bits necessary for representing the number of areas generated by dividing the received measured limit distance 22 into the received depth resolution. Herein, the term area refers to a result obtained by dividing a measured limit distance into a quantization step size. Thereafter, the adaptive quantization unit 23 may quantize each depth value of pixels of a 3D image that is input through an input terminal IN2 by using the determined bit number, represent each depth value, and output the quantized depth value through an output terminal OUT1.

In this case, less memory is necessary compared to conventional systems for storing and/or transmitting the depth information, as conventional systems merely implement an unnecessarily large number of bits (e.g., 16 bits) for representing the depth information without regard to the depth resolution of the depth camera 21. Further, according to an embodiment, decoding can be accomplished according to the appropriate corresponding quantization step sizes.

As only an example, if it is assumed that the measured limit distance 22 is 10 m, and a depth resolution of the depth value that can be measured by the depth camera 21 has a quantization step size of 3 mm, a minimum number of bits that can be used to present the depth value, e.g., by the adaptive quantization unit 23, within an error range of 3 mm can be expressed according to the below Equation 1, for example.

$$\left\lceil \log_2 \frac{10000 \text{ mm}}{3 \text{ mm}} \right\rceil = 12 \qquad \text{Equation 1}$$

Here, the shown bracketing within Equation 1, for example, indicates a minimum integer number exceeding a value inside the brackets.

Thus, according to this embodiment, if a conventional method represents each depth value of each pixel of a 3D image through 16 bits, the depth value of each pixel in the present embodiment would only need to be represented through 12 bits, while still having the same accuracy as the conventional method.

In addition to the above, a general depth value that can be measured by the depth camera 21 may have a higher depth resolution as a distance is nearer to the depth camera 21, and a lower depth resolution as the distance is farther from the depth camera 21. Accordingly, although it may be desirable for a depth to be finely represented at the nearer distance, it is often unnecessary to finely represent the depth at the farther distance. In this case, since the depth camera 21 represents all depth values that it can measure with the same depth resolution, when the depth resolution is focused on a near distance from the depth camera 21 an unnecessarily large number of bits is allocated to depth values corresponding to farther distances from the depth camera 21, while when the depth resolution is focused on the farther distance from the depth camera 21 the depth values corresponding to the near distance from the depth camera 21 may be more accurately represented.

Thus, based on the above characteristics, according to an embodiment, depth information measured from the near distance can be represented using a fine depth resolution, and depth information measured from the far distance can be represented using a coarse depth resolution, so that bits can be accurately and efficiently allocated.

FIGS. 3A through 3D illustrate an apparatus implementing such adaptive information representing of depth information of a 3D image, according to embodiments of the present invention. Herein, the term apparatus should be considered synonymous with the term system, and not limited to a single enclosure or all described elements embodied in single respective enclosures in all embodiments, but rather, depending on embodiment, is open to being embodied together or separately in differing enclosures and/or locations through differing elements, e.g., a respective apparatus/system could be a single processing element or implemented through a distributed network, noting that additional and alternative embodiments are equally available.

Figure 3A:
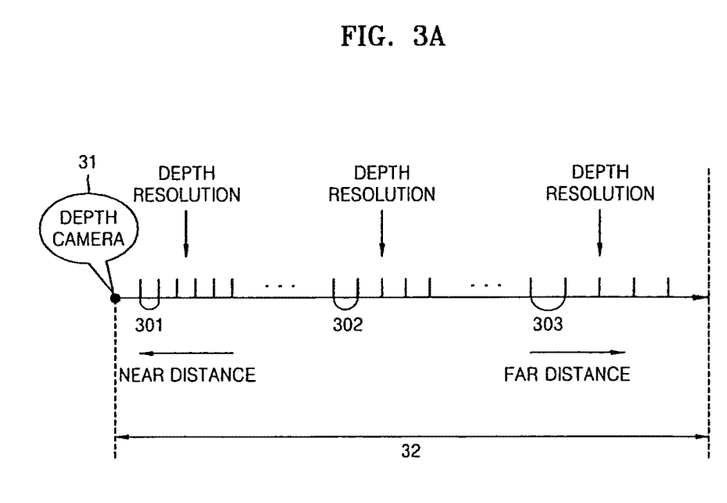
FIGS. 3A through 3D illustrate an apparatus implementing an adaptive representing of depth information of a 3D image, according to one or more embodiments of the present invention.

FIG. 3A explains a depth information representation of a depth camera 31 incorporating an apparatus adaptively representing depth information of a depth image by measuring depth information to different accuracies according to respective depth values.

To adaptively represent depth information for a depth image, a measured limit distance 32 may be divided/parsed into plural of sections or ranges 301, 302, and 303, for example, that can be applied the same depth resolution, such that respective depth values are quantized and represented by using different quantization step sizes for each divided section.

Measured limit distance information regarding the measured limit distance 32 and depth resolution information regarding respective depth resolutions defined according to distances may be received from the depth camera 31. Herein, the depth resolution defined by distances refers to respective depth resolutions for different distances from the depth camera 31. Accordingly, the measured limit distance 32, included in the received measured limit distance information, can be divided into a plurality of sections, with each section having the same depth resolution, according to the depth resolution defined accord distances included in the received depth resolution information.

A number of bits to be used for each respective section defined by according to their respective distances from the depth camera 31 may, thus, be allocated. In an embodiment, the number of bits may be a minimum number of bits necessary for representing the depth information, through a result obtained by dividing the length of a section into the depth resolution of the section. That is, the respective number of bits may be a minimum number of bits necessary for representing each of the number of areas generated by dividing the length of a section into the depth resolution of the section.

Accordingly, depth information regarding a predetermined object may be measured.

As a result, each depth value may be quantized and represented by using the appropriate number of bits defined by the respective section distances from the depth camera 31.

Figure 3B:
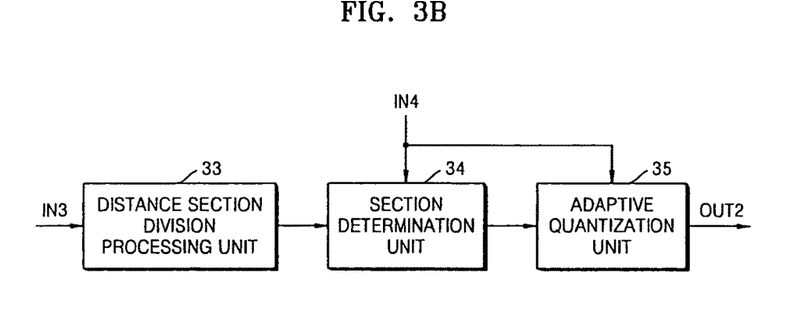

Referring to FIG. 3B, an apparatus adaptively representing information on the depth information of the 3D image may include a distance section division processing unit 33, a section determination unit 34, and an adaptive quantization unit 35, for example.

The distance section division processing unit 33, to represent an adaptive depth resolution value, receives measured limit distance information on the measured limit distance 32 of the 3D image and depth resolution distance definition information regarding the 3D image through an input terminal IN3, and divides the measured limit distance 32 included in the received measured limit distance information into corresponding plural sections/ranges based on the depth resolution distance definition information. Herein, the measured limit distance 32 regarding the 3D image refers to a measured limit distance that may be predetermined as a specification of the depth camera 31, for example. The depth resolution distance definition regarding the 3D image refers to respective depth resolutions having different values for each section, which may also be predetermined as a specification of the depth camera 31, for example.

The distance section division processing unit 33 may, thus, then determine the appropriate respective number of bits that should be used in representing depth information within each section.

The section determination unit 34 may recognize these determined sections, and further determine to which section each depth value of pixels of the 3D image, e.g., as input through an input terminal IN4, should be categorized.

The adaptive quantization unit 35 may further recognize the appropriate number of bits, e.g., as determined by the distance section division processing unit 33, and quantize each depth value of pixels of the 3D image, e.g., input through the input terminal IN4, according to the corresponding section determination by the section determination unit 34. In more detail, the adaptive quantization unit 35 may quantize and represent each depth value by using the appropriate number of bits based on the respective distance of the object from the depth camera, or on respective distance per section to which each depth value belongs, and output the quantized result through an output terminal OUT2.

The measured limit distance information and the depth resolution distance definition information that may be input through the input terminal IN3, thus, concern the 3D image that is input through the input terminal IN4.

Figure 3C:
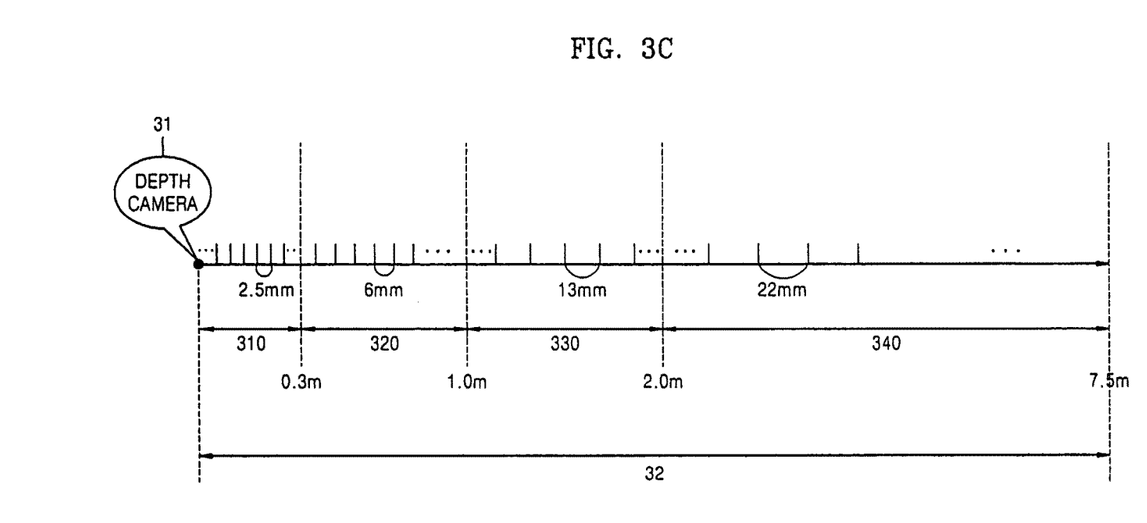

FIG. 3C illustrates an adaptive information presentation of depth information of a 3D image. As only an example, it will be assumed that the measured limit distance 32 of FIG. 3C is 7.5 m.

As illustrated, the first section 310 represents points up to 0.3 m from the depth camera 31, with a depth resolution thereof being represented by a quantization step size of 2.5 mm. The second section 320 represents points up to 1 m beyond the first section 310, with a depth resolution thereof being represented by a quantization step size of 6 mm. The third section 330 represents points up to 2 m beyond the second section 320, with a depth resolution thereof being represented by a quantization step size of 13 mm. Finally, in this example, the fourth section 340 represents points up to 7.5 m beyond the third section 330 (or all points beyond the third section 330), with a depth resolution thereof being represented by a quantization step size of 22 mm.

In this example, a minimum number of bits that may be used to represent the depth resolution of each of the first through fourth sections 310 through 340 may be further calculated, as shown below. In more detail, the distance section division processing unit 33 may determine the appropriate number of bits that should be used for points that fall within the first section 310 according to the below Equation 2, for example, the appropriate number of bits that should be used for points that fall within the second section 320 according to the below Equation 3, for example, the appropriate number of bits to be used for points that fall within the third section 330 according to the below Equation 4, for example, and the appropriate number of bits that should be used for points that fall within the fourth section 340 according to the below Equation 5, for example.

$$\left\lceil \log_2 \frac{300 \text{ mm}}{2.5 \text{ mm}} \right\rceil = 7 \qquad \text{Equation 2}$$

$$\left\lceil \log_2 \frac{1000 \text{ mm} - 300 \text{ mm}}{6 \text{ mm}} \right\rceil = 7 \qquad \text{Equation 3}$$

$$\left\lceil \log_2 \frac{2000 \text{ mm} - 1000 \text{ mm}}{13 \text{ mm}} \right\rceil = 7 \qquad \text{Equation 4}$$

$$\left\lceil \log_2 \frac{7500 \text{ mm} - 2000 \text{ mm}}{22 \text{ mm}} \right\rceil = 8 \qquad \text{Equation 5}$$

When each depth value for pixels of the 3D image is quantized and represented, it may, thus, be further necessary to separately represent additional information on which depth value is included in the first through fourth sections 310 through 340. In an embodiment, as the number of example sections is 4, such additional information could be represented using 2 bits, noting that alternative embodiments are equally available.

Accordingly, in such an example, conversely to conventional techniques where each depth value for the pixels of the 3D image would be represented using 16 bits, here each depth value may be represented using one of 9, 9, 9, and 10 bits according to the respective first through fourth sections 310 through 340. Thus, a depth value of a pixel representing a point observed by the depth camera can be represented using substantially less bits than the conventional techniques while providing the same or similar accuracy.

Referring again to FIG. 3B, the measured limit distance 32 was shown as being divided into a plurality of sections, and independent quantization of each section was performed for the representation of each depth value. Further, if representative values have previously been established based on a depth resolution that varies according to distances with respect to the measured limit distance 32, a look-up table of the representative value may be prepared, and an input depth value quantized and represented based on that look-up table. Accordingly, such an arrangement will now be further discussed with reference to FIGS. 3C and 3D.

Referring again to FIG. 3C showing the depth resolution of the first through fourth sections 310 through 340 corresponding to (0~0.3 m), (0.3 m~1.0 m), (1.0 mm~2.0 m), and (2.0 m~7.5 m), respectively, the number of representative values that present each depth value falling within each section can be determined as follows. The number of representative values indicting depth values falling within the first section 310 may be represented according to the below Equation 6, for example, the number of representative values indicting depth values falling within the second section 320 may be represented according to the below Equation 7, for example, the number of representative values indicting depth values falling within the third section 330 may be represented according to the below Equation 8, and the number of representative values indicting depth values falling within the fourth section 340 may be represented according to the below Equation 9, also as only an example.

$$\left\lceil \frac{300 \text{ mm}}{2.5 \text{ mm}} \right\rceil = 120 \qquad \text{Equation 6}$$

$$\left\lceil \frac{1000 \text{ mm} - 300 \text{ mm}}{6 \text{ mm}} \right\rceil = 117 \qquad \text{Equation 7}$$

$$\left\lceil \frac{2000 \text{ mm} - 1000 \text{ mm}}{13 \text{ mm}} \right\rceil = 77 \qquad \text{Equation 8}$$

$$\left\lceil \frac{7500 \text{ mm} - 2000 \text{ mm}}{22 \text{ mm}} \right\rceil = 250 \qquad \text{Equation 9}$$

Thus, in these examples, the total number of representative values may be 564, which can be represented using 10 bits. Thus, referring to FIG. 3D illustrating an apparatus for presenting adaptive information on depth information on the 3D image, a look-up table including 564 representative values of the measured limit distance 32 may be prepared, and each depth value of each of the pixels of the 3D image may be quantized and represented using 10 bits based on the look-up table.

Unlike the previous example shown in FIG. 3B, here, when each depth value of pixels of the 3D image is quantized and represented, it may be unnecessary to also include information indicating which section each depth value falls within.

Figure 3D:
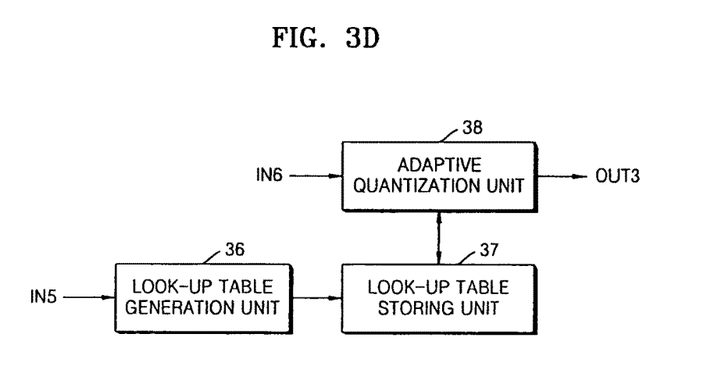

Referring to FIG. 3D, the adaptive quantization unit 38 may quantize and present each depth value of pixels of the 3D image by using 10 bits. Differently from the conventional techniques where each depth value of pixels of the 3D image is represented using 16 bits, the adaptive quantization unit 38 may represent a depth value of a pixel using substantially less bits with the same or similar accuracy.

As shown in FIG. 3D, the apparatus for representing adaptive information on depth information on the 3D image may, thus, include a look-up table generation unit 36, a look-up table storing unit 37, and the adaptive quantization unit 38, for example.

To represent an adaptive depth resolution value, the look-up table generation unit 36 may receive measured limit distance information indicating the measured limit distance 32 and depth resolution information distance definition information indicating depth resolution according to distance with regard to the 3D image through an input terminal IN5, divide the measured limit distance 32 into plural areas/ranges based on the corresponding depth resolutions, establish a representative value for each divided area, quantizes each established representative value by using the number of bits corresponding to the number of the areas, and generate the look-up table including the quantized representative values. The number of bits corresponding to the number of areas may be a minimum number of bits necessary for representing the number of areas of the measured limit distance 32.

The look-up table generated by the look-up table generation unit 36 may include the quantized representative values, each corresponding to the areas.

The look-up table storing unit 37 may further store the look-up table generated by the look-up table generation unit 36.

The adaptive quantization unit 38 may output the representative values, corresponding to each depth value of the pixels of the 3D image, as input through an input terminal IN6, from among the representative values included in the look-up table, through an output terminal OUT3 as the quantized result of each depth value.

Here, the received measured limit distance information and the depth resolution information distance definition information, e.g., received through the input terminal IN5, are information on the measured limit distance 32 and the depth resolution information with regard to the 3D image that is input through the input terminal IN6.

Figure 4A:
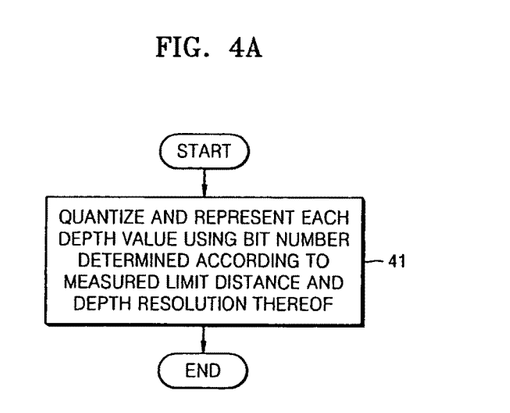
FIGS. 4A through 4C illustrate methods of adaptively representing information of depth information of a 3D image, according to embodiments of the present invention.

FIG. 4A illustrates a method of adaptively representing information of depth information of a 3D image according to an embodiment of the present invention. Though alternate embodiments are available, an example embodiment will be further discussed with reference to FIG. 2B.

Here, the adaptive quantization unit 23 may quantize and represent each depth value of pixels of the 3D image by using the appropriate number of bits determined according to a measured limit distance of the depth camera 21 and depth resolution thereof (operation 41).

Figure 4B:
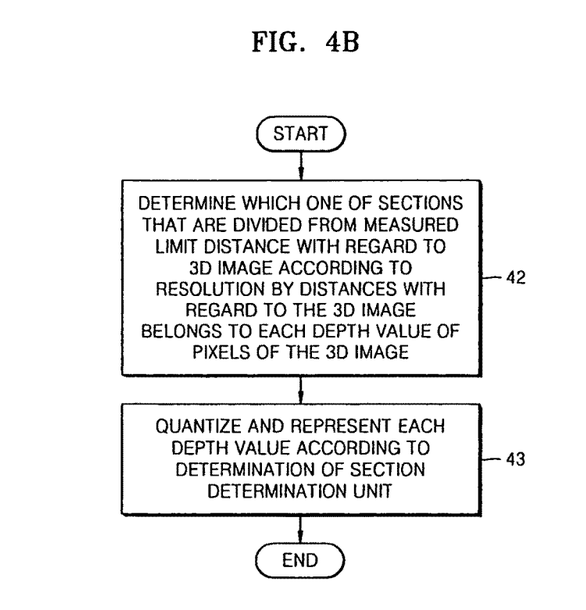

FIG. 4B illustrates a method of adaptively presenting information of depth information of a 3D image according to an embodiment of the present invention. Again, though alternate embodiments are available, an example embodiment will be further discussed with reference to FIG. 3B.

Here, the section determination unit 34 may determine which of the sections, in the sections having been divided according to a measured limit distance of the 3D image and distanced based depth resolution assignments, the corresponding point falls within for representing the corresponding depth value of pixels of the 3D image (operation 42).

The adaptive quantization unit 35 may, thus, quantize and represent each depth value of each corresponding pixel of the 3D image according to the determination of the section determination unit 34 (operation 43).

Figure 4C:
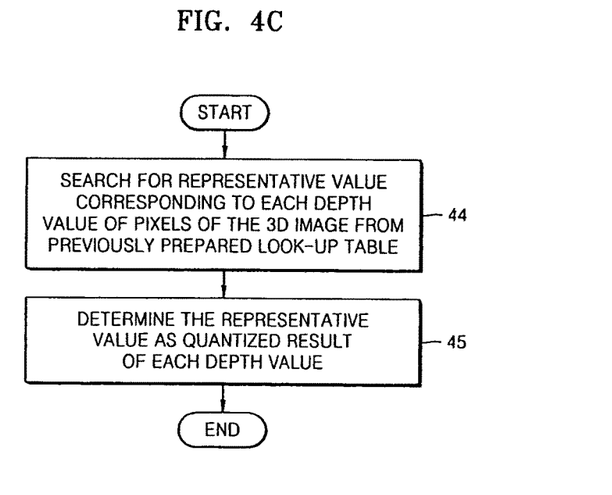

FIG. 4C illustrates a method of adaptively representing information of depth information of a 3D image according to an embodiment of the present invention. Though alternate embodiments are available, an example embodiment will be further discussed with reference to FIG. 3D.

Here, the adaptive quantization unit 38 may search for a representative value corresponding to each depth value for each corresponding pixel of the 3D image from the look-up table, e.g., stored in the look-up table storing unit 37 (operation 44).

The adaptive quantization unit 38 may further determine the representative value that is found from the look-up table and, thus, corresponds to each depth value of pixels of the 3D image, as the quantized result of each depth value (operation 45).

Embodiments can be implemented in computing hardware (computing apparatus) and/or software, such as (in a non-limiting example) any computer that can store, retrieve, process and/or output data and/or communicate with other computers, for example. Results produced can be displayed on a display of the computing hardware. A program/software implementing embodiments may be recorded on computer-readable media including computer-readable recording media. The program/software implementing embodiments may also be transmitted over transmission communication media. Examples of the computer-readable recording media include at least a magnetic recording apparatus, an optical disk, a magneto-optical disk, and/or a semiconductor memory (for example, RAM, ROM, etc.). Examples of the magnetic recording apparatus include at least a hard disk device (HDD), a flexible disk (FD), and a magnetic tape (MT). Examples of the optical disk include at least a DVD (Digital Versatile Disc), a DVD-RAM, a CD-ROM (Compact Disc-Read Only Memory), and a CD-R (Recordable)/RW. An example of communication media includes a carrier-wave signal. A transmission communication media may be an apparatus that carries such a communication media.

Further, according to one or more aspects of the present invention, any combination of the described features, functions, and/or operations may also be provided.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. An apparatus adaptively representing information of depth information of a 3D image, the apparatus comprising:
    a processor to control each of the following units;
    a distance section division processing unit to receive the 3D image including a depth value ranging from 0 to a measured limit distance which is a fixed value for specification of camera capturing the 3D image, and divide the measured limit distance into plural sections, wherein the section is an interval having a fixed/uniform step size;

a section determination unit to determine which one of plural sections depth values for pixels of the 3D image fall within; and an adaptive quantization unit to generate section information indicating the determined section, and quantize the depth value based on the fixed/uniform step size of the determined section, wherein section information is represented by a fixed number of bits, wherein a step size for the section near 0 is smaller than a step size for the section near the measured limit distance.

2. The apparatus of claim 1, wherein the adaptive quantization unit selectively quantizes each depth value to have a defined number of bits determined based on the step size of the determined section.

3. The apparatus of claim 1, wherein the defined number of bits is determined to be a minimum number of bits, as defined by dividing each section according to respective step size of each section.

4. The apparatus of claim 1, wherein the apparatus is a depth camera to derive the depth values for the pixels of the 3D image.

5. The apparatus of claim 4, wherein the measured limit distance for the 3D image is determined by the depth camera and the depth camera and the respective distance based depth resolution information for each section is predefined according to a resolution capability of the depth camera.

6. A method of representing adaptive information of depth information of a 3D image, the method comprising:

receiving the 3D image including a depth value ranging form 0 to a measured limit distance which is a fixed value for specification of camera capturing the 3D image;

dividing the measured limit distance for the 3D image into plural sections, wherein the section is an interval having a fixed/uniform step size;

determining which one of the plural sections depth values for pixels of the 3D image fall within; and generating section information indicating the determined section, and quantizing the depth value based on the fixed/uniform step size of the determined section, wherein the section information is represented by a fixed number of bits, wherein a step size for the section near 0 is smaller than a step size for the section near the measured limit distance.

7. The method of claim 6, wherein the selective quantizing and representing of each depth value comprises quantizing each depth value to have a defined number of bits determined based on the step size of the determined section.

8. The method of claim 7, wherein the defined number of bits is determined to be a minimum number of bits, as defined by dividing each section according to respective step size of each section.

9. A depth data encoder adaptively representing depth information of a 3D image by selectively quantizing, using a processor, and the depth data encoder comprising:

a distance section division processing unit to receive a 3D image including a depth value ranging from 0 to a measured limit distance which is a fixed value for specification of camera capturing the 3D image, and divide the measured limit distance into plural sections, wherein the section is an interval having a fixed/uniform step size;

a section determination unit to determine which one of the plural sections depth values for the pixels of the 3D image fall within; and an adaptive quantization unit to generate section information indicating the determined section, and quantize the depth value based on the fixed/uniform step size of the determined section, wherein section information is represented by a fixed number of bits, wherein a step size for the section near 0 is smaller than a step size for the section near the measured limit distance.

10. The encoder of claim 9, wherein the quantization steps are based upon defining a fixed bit length for a result of the quantizing of respective depth values of the pixels of the 3D image.

11. The encoder of claim 10, wherein the selective quantizing of the depth values is based upon a categorizing of respective depth values based on respective step size of the determined section, with the categorizing of the respective depth values defines different quantization steps to be applied in the quantizing the respective depth values.

12. A depth data encoding method adaptively representing depth information of a 3D image including selectively quantizing depth values of pixels of the 3D image, wherein, the method further comprising:

receiving the 3D image including a depth value ranging form 0 to a measured limit distance which is a fixed value for specification of camera capturing the 3D image;

dividing the measured limit distance for the 3D image into plural sections, wherein the section is an interval having a fixed/uniform step size;

determining which one of plural sections depth values for pixels of the 3D image fall within, with the plural sections being defined by a measured limit distance for the 3D image being divided into the plural sections based on the step size;

generating section information indicating the determined section, and quantizing the depth value based on the fixed/uniform step size of the determined section, wherein the section information is represented by a fixed number of bits, wherein a step size for the section near 0 is smaller than a step size for the section near the measured limit distance.

13. The method of claim 12, wherein the quantization steps are based upon defining a fixed bit length for a result of the quantizing of respective depth values of the pixels of the 3D image.

14. The method of claim 12, further comprising a depth camera to derive the depth values for the pixels of the 3D image.

15. At least one non-transitory computer readable medium comprising computer readable code to control at least one processing element to implement the method of claim 6.

16. At least one non-transitory computer readable medium comprising computer readable code to control at least one processing element to implement the method of claim 12.

* * * * *

UNITED STATES PATENT AND TRADEMARK OFFICE
CERTIFICATE OF CORRECTION

PATENT NO. : 8,620,099 B2  Page 1 of 1
APPLICATION NO. : 12/219444
DATED : December 31, 2013
INVENTOR(S) : Sim It is certified that error appears in the above-identified patent and that said Letters Patent is hereby corrected as shown below:

In the Claims

Column 11, Lines 24-25, in Claim 5, delete "the depth camera and the depth camera and the" and insert -- the depth camera and the --, therefor.
Column 11, Line 31, in Claim 6, delete "form 0" and insert -- from 0 --, therefor.
Column 12, Line 29, in Claim 12, delete "form 0" and insert -- from 0 --, therefor.

Signed and Sealed this
Twenty-second Day of July, 2014

Michelle K. Lee
*Deputy Director of the United States Patent and Trademark Office*